United States Patent Office 3,483,163
Patented Dec. 9, 1969

3,483,163
METAL MERCAPTIDE CURING AGENTS FOR POLYEPOXIDE RESINS
George W. Holmes, Walnut Creek, Calif., assignor to The Dow Chemical Company, Midland, Mich., a corporation of Delaware
No Drawing. Filed July 21, 1967, Ser. No. 654,964
Int. Cl. C08g 30/10
U.S. Cl. 260—47                    7 Claims

ABSTRACT OF THE DISCLOSURE

Bis (β-aminoethylmercaptides) of zinc, mercury and nickel, when admixed with polyepoxide resins, rapidly cure the compositions at elevated temperatures yet provide good shelf life for the compositions at ambient storage temperatures.

---

This invention relates to a process for curing polyepoxide resins. More particularly, the invention relates to a new process utilizing certain metal mercaptide amine curing agents and to the useful products obtained thereby.

Polyepoxides, such as those obtained by reacting epichlorohydrin with polyhydric phenols and polyhydric alcohols in the presence of caustic, have been cured with a variety of agents including many different amine compounds to form insoluble, infusible products. These resinous reaction products when suitably cured exhibit properties which make them highly desirable for many uses such as coatings, adhesives, pottings and castings, reinforced plastic articles and the like.

The following have been disclosed as curing agents: mercaptans, in U.S. 2,933,473; supercooled solutions of amines in U.S. 2,904,530; alcoholates in U.S. 2,767,158; etc. Polyamines represent one general class of curing agents which includes aliphatic, aromatic and mixed or aralkylamines. Since the aliphatic amines are generally liquids they have been quite widely used. However, resin mixtures with such amines generally have a short pot life. To increase the pot life other amines, such as aromatic amines, have been utilized but the aromatic amines impact different curing characteristics. A sought after curing agent has been one providing good pot life and the fast curing characteristic of aliphatic amines under curing conditions.

Accordingly the process of this invention provides for curing agents, admixtures of which with polyepoxides have good pot life at room temperature and cure rapidly at an elevated temperature. The curing agents useful in the process of this invention include certain metal mercaptides, notably zinc, mercury and nickel, prepared from mercaptoethylamine. The metal mercaptide amine curing agents are solids which are readily admixed with liquid polyepoxides or finely ground solid polyepoxides.

Polyepoxides useful in this process include those resins containing an oxirane group,

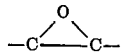

wherein the polymer molecules contain an average of more than one oxirane group per molecule. Such polyepoxide resins may be liquids or solids, saturated or unsaturated, cycloaliphatic, aromatic or heterocyclic, and may be substituted to contain chlorine or bromine, hydroxyl groups and the like. The resins may be polymeric or monomeric. The oxirane group may occupy various positions within the molecule such as terminal, internal, ring situated, glycidyl, etc.

While there are many types of polyepoxides, three types predominate: (a) glycidyl polyethers of polyhydric phenols and polyhydric alcohols, (b) glycidyl polyethers prepared from novolac resins (the epoxy novolacs) and (c) the epoxidized polyolefin resins, such as epoxidized polybutadiene, and epoxidized resins and oils. Such resins are described in greater detail in a number of textbooks, such as "Epoxy Resins" by H. Lee and K. Neville, McGraw-Hill Book Co., Inc., New York, 1957 or "Handbook of Reinforced Plastics" by S. Oleesky and G. Mohr, Reinhold Publishing Corporation, New York, 1964.

The metal mercaptide curing agents are prepared from mercaptoethylamine, preferably as the amine hydrochloride, although alternative methods of preparation may be used. Preferred metals include zinc, mercury and nickel as divalent ions and the curing agents may be prepared according to the following general reaction where $M^{++}$ represents the metal ion:

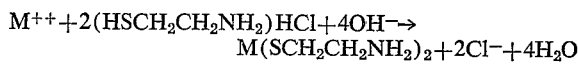

For example, zinc bis(β-aminoethylmercaptide) was prepared by dissolving 22.8 gms. (0.2 mole) of mercaptoethylamine hydrochloride and 13.6 gms. (0.1 mole) of zinc chloride in 200 ml. of water. With stirring 32 gms. (0.4 mole) of 50% aqueous sodium hydroxide were added dropwise over a few minutes. A slurry formed and the temperature rose to 45° C. After stirring for 2 hours the mixture was filtered and the white solid dried in vacuo at room temperature. A 14.7 gm. yield of product was obtained. The solid may be recrystallized from hot water (25 ml./gm.) but this was found to be unnecessary for use as a polyepoxide curing agent.

Using the above reaction, curing agents of the formula $M(SCH_2CH_2NH_2)_2$ was prepared wherein M is a divalent metal cation, preferably $Zn^{++}$, $Hg^{++}$ and $Ni^{++}$. Zinc bis(β-aminoethylmercaptide) is preferred.

According to the process of this invention the metal mercaptide amine curing agent is admixed with a polyepoxide resin in such amounts as to provide from about 5 to about 40 parts by weight of said curing agent per 100 parts of polyepoxide resin, preferably from 10 to 30 parts by weight of curing agent. The mixture may be set or cured by heating to a temperature from about 100° C. to about 200° C. or more with best results obtained by heating to about 150° C. to about 175° C.

To illustrate the manner in which the invention may be carried out the following non-limiting examples are provided.

EXAMPLE I

The ability of zinc bis(β-aminoethylmercaptide) to curve various polyepoxide resins was evaluated by determining the seconds to gel a mixture by the conventional stroke cure test. Additionally various levels of the zinc mercaptide curing agent were evaluated.

Polyepoxide Resin A is a commercially available glycidyl polyether of bisphenol A having an epoxide equivalent weight of about 186–192.

Polyepoxide Resin B is a commercially available glycidyl polyether of bisphenol A having an epoxide equivalent weight of about 172 to 178.

Polyepoxide Resin C is a commercially available glycidyl polyether of a cresol-formaldehyde novolac having an epoxide equivalent weight of about 225.

The results of these tests are shown below in Table I.

TABLE I

| Polyepoxide resin: | Zn-Mercaptide curing agent [1], phr. | Temp., °C. | Seconds to gel |
|---|---|---|---|
| A | 5 | 165 | 1,000 |
| A | 10 | 165 | 142 |
| A | 20 | 165 | 87 |
| A | 30 | 165 | 68 |
| A [2] | 30 | 140 | 113 |
| A [2] | 30 | 150 | 70 |
| A [2] | 30 | 165 | 41 |
| B | 5 | 165 | 1,000 |
| B | 10 | 165 | 154 |
| B | 20 | 165 | 92 |
| B | 30 | 165 | 77 |
| C | 5 | 165 | 106 |
| C | 10 | 165 | 62 |
| C | 20 | 165 | 45 |
| C | 25 | 165 | 39 |
| C | 30 | 165 | 41 |

[1] Phr., parts per hundred parts of resin.
[2] Gel tests made on mixture after standing at room temperature for 4 days.

EXAMPLE II

Shelf life studies were also made with the same resins and curing agent of Example I with the results shown in Table II.

TABLE II

| | Curing agent, phr. | Seconds to gel, 165° C., after storage at room temperature in days | | | | |
|---|---|---|---|---|---|---|
| | | 0 | 7 | 11 | 20 | 33 | 51 |
| Resin: | | | | | | | |
| A | 30 | 60 | 35 | 32 | | | 20 |
| A | 10 | 154 | | | 134 | 103 | 91 |
| B | 10 | 154 | | | 138 | 108 | 92 |
| C | 5 | 90 | 400 | | | | |

Although the viscosities of the test samples increased slowly during storage at room temperature, all were fluid at the curing temperature of 165° C.

EXAMPLE III

Using polyepoxide Resin C tests were made with the $Zn^{++}$, $Ni^{++}$ and $Hg^{++}$ mercaptide curing agents as shown in Table III.

TABLE III

| Curing agent, $M(SCH_2CH_2NH_2)_2$: | Phr. | Seconds to gel at 165° C. |
|---|---|---|
| M=Zn | 10 | 62 |
| M=Hg | 10 | 46 |
| M=Ni | 10 | 1,400 |

EXAMPLE IV

A differential thermal analysis curve was prepared for a mixture of Resin A and 10 phr. $Zn(SCH_2CH_2NH_2)_2$ wherein the micsosample was heated at a rate of 20° C./min. starting at room temperature. An exothermic curing reaction started in the range of 100–120° C. and by 140–150° C. the temperature rise was very rapid. The maximum exotherm occurred at 175° C. after which the exotherm rapidly subsided. No other significant endo- or exotherms occurred up to 250° C.

EXAMPLE V

The zinc mercaptide curing agent was further tested in an adhesive application and compared to dicyandiamide. Polyepoxide mixtures were made with Resin B and 30 phr. of $Zn(SCH_2CH_2NH_2)_2$ in one case and 10 phr. of dicyandiamide in the other case. Both mixtures also contained 10 phr. of colloidal silica as a thixotroping agent.

Adhesion tests were made by bonding 1" x 4" x 1/16" 2024ST aluminum tabs together with a 1" x 1/2" overlap. The mating surfaces were wire brushed and wiped with a solvent before applying the adhesive. The samples were cured in a forced air oven at 160° C. for various times. The samples were removed from the oven, cooled and tested later in an Instron tensile tester.

TABLE IV

| Curing Agent | Shear Strength, p.s.i.; Minutes in 160° C. Oven | | | | | |
|---|---|---|---|---|---|---|
| | 3 | 4 | 5 | 10 | 30 | 6 |
| This invention | 0 | 340 | 1,060 | >2,000 | >2,000 | >2,000 |
| Dicyandiamide | 0 | 0 | 0 | 0 | 300Ω | 2,000 |

All tests were made in duplicate and 2000 p.s.i. was the maximum of the Instron.

What is claimed is:
1. A process of curing polyepoxide resins which comprises mixing a curing agent having the formula $M(SCH_2CH_2NH_2)_2$, wherein M is Zn, Hg or Ni, with a polyepoxide resins having more than one oxirane group per molecule and heating to a temperature of at least about 100 degrees C. to set the composition; said mixture containing from about 5 to about 40 parts of said curing agent per 100 parts of polyepoxide resin.

2. The process of claim 1 wherein the polyepoxide resin is a glycidyl polyether of a polyhydric phenol.

3. The process of claim 1 wherein the polyepoxide resin is an epoxy novolac resin.

4. A thermosettable resin composition which comprises a polyepoxide resin having more than one oxirane group per molecule and from about 5 to about 40 parts per 100 parts of said resin of a curing agent having the formula $M(SCH_2CH_2NH_2)_2$ wherein M is Zn, Hg or Ni.

5. The composition of claim 4 wherein the polyepoxide resin is a glycidyl polyether of a polyhydric phenol.

6. The composition of claim 4 wherein the polyepoxide resin is an epoxy novolac resin.

7. A cured resin prepared by heating the composition of claim 4 to a temperature of at least about 100 degrees C.

References Cited

UNITED STATES PATENTS

| 2,933,473 | 4/1960 | Schmitz | 260—47 |
| 3,058,948 | 10/1962 | Mosimann et al. | 260—835 |
| 3,322,851 | 5/1967 | Berenbaum | 260—830 |
| 3,397,157 | 8/1968 | Holmes | 260—2 |

HAROLD D. ANDERSON, Primary Examiner

H. SCHAIN, Assistant Examiner

U.S. Cl. X.R.

260—2, 59, 88.3